United States Patent [19]
Waterson et al.

[11] Patent Number: 5,468,291
[45] Date of Patent: Nov. 21, 1995

[54] METAL SHREDDER RESIDUE-BASED LANDFILL COVER

[75] Inventors: Bruce P. Waterson, North Smithfield, R.I.; Dennis L. Caputo, Bellaire; William R. McLaughlin, Houston, both of Tex.

[73] Assignees: Hugo Neu & Sons Inc., New York, N.Y.; Proler International Corp., Houston, Tex.

[21] Appl. No.: 37,263

[22] Filed: Mar. 26, 1993

[51] Int. Cl.$^6$ ............................................. C04B 18/04
[52] U.S. Cl. ........................ 106/697; 106/713; 106/816; 106/718; 106/900; 405/129
[58] Field of Search .................................. 106/697, 713, 106/716, 816, 819, 900, 718; 501/155; 405/129; 588/252

[56] References Cited

U.S. PATENT DOCUMENTS

| | | | |
|---|---|---|---|
| 4,432,666 | 2/1984 | Frey et al. | 405/129 |
| 4,475,951 | 10/1984 | Davis . | |
| 4,671,882 | 6/1987 | Douglas et al. . | |
| 4,687,373 | 8/1987 | Falk et al. . | |
| 4,737,356 | 4/1988 | O'Hara et al. . | |
| 5,051,031 | 9/1991 | Schumacher et al. | 405/129 |
| 5,130,051 | 7/1992 | Falk . | |
| 5,286,430 | 2/1994 | Downs et al. | 106/697 |

OTHER PUBLICATIONS

Trezek, G. J., "Application of the Polysilicate Technology to Heavy Metal Waste Streams", Submitted to State of California, Department of Health Services, Aug. 1987.
Dahnke et al., "Selective Recovery of Metal Values from Electroplating Sludges", Montana College of Mineral Science and Technology, pp. 1–20 (Date Unknown).
"Evaluation of Auto Shredder Residue for Use in Portland Cement Manufacturing", Dec. 1991, I SRI.
Lopat Enterprises, Inc., TCLP Test Results on F006 Sludge Before and After Treatment with Lopat's K–20/LS System (date unknown).
Lopat Enterprises, Inc., Lead–In–Soil Control product literature (date unknown).
American Recycling Equipment Corporation, REMU screen product literature (date unknown).
Letter dated Apr. 17, 1986 from County of Dane, Madison Wisconsin regarding Midwest Steel "Shredder Fluff".
Letter dated Jun. 13, 1986 from State of Wisconsin, Department of Natural Resources regarding Plan Modification Approval, Shredder Fluff Supplement for Daily Cover Soil Needs, Dane County Sanitary Landfill.
Letter dated Feb. 14, 1991 from State of Maryland, Department of the Environment regarding shredder fluff.
Memo dated Jun. 25, 1992 from State of Florida Department of Environment Regulation.
Letter dated Jun. 26, 1992 from Florida Department of Environmental Regulation.
Letter dated Dec. 2, 1992 from ISRI.
State of Wisconsin, 1989 Wisconsin Act 335 dated May 10, 1990.
State of California, Assembly Bill No. 1760, signed Oct. 11, 1991.

*Primary Examiner*—Mark L. Bell
*Assistant Examiner*—Michael Marcheschi
*Attorney, Agent, or Firm*—Fish & Richardson

[57] ABSTRACT

A metal shredder residue-based landfill cover material composed of a mixture of moist substantially non-metallic residue of select maximum size and cementitious particles. The material can be formed by processes that efficiently remove large amounts of metal from metal waste items.

32 Claims, 3 Drawing Sheets

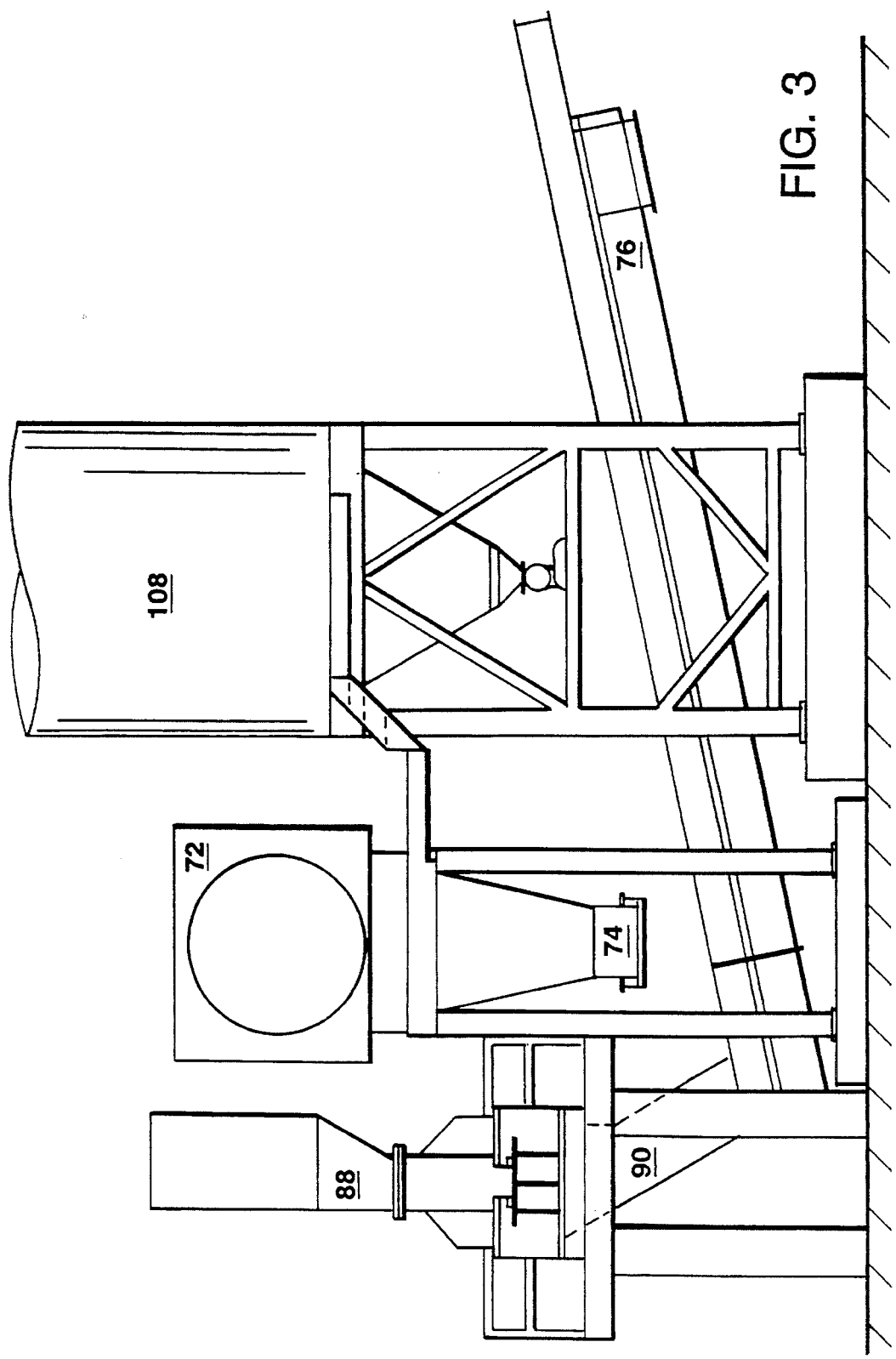

METAL SHREDDER RESIDUE-BASED LANDFILL COVER

FIELD OF THE INVENTION

This invention relates to metal shredder processes, landfill covers, and maintaining landfill refuse dumps using landfill cover.

BACKGROUND OF THE INVENTION

One way of reducing landfill waste is to recover recyclable metal from refuse items. The metal from items like automobiles, major appliances, etc., can be recovered by shredding processes, in which the items are shredded by hammermill action into pieces of a workable size that are passed through apparatus, such as magnetic separators and air separation systems, to separate metal from the synthetic foam, fabric, rubber, stone, dirt and so on, also incorporated within the waste items. The metal recovered from the shredding process can, of course, be reused. The substantially non-metallic residue by-product is usually referred to as "automobile shredder residue" (ASR) or "shredder fluff".

An interim or daily landfill cover is a layer of material that is spread over refuse typically at the end of each day. The purpose of the cover is to contain the refuse; i.e., it keeps the refuse from being picked up by wind; it presents a barrier to rodents, birds and other vectors that might scavenge or burrow into the refuse; it contains odors; and, importantly, it provides a barrier that isolates the refuse from sources in the environment that could ignite the refuse and, should a fire occur internally within a layer of refuse from one day, the cover inhibits the spread of the fire to adjacent layers of refuse that were disposed on previous or subsequent days.

SUMMARY OF THE INVENTION

In this invention, landfill cover material is composed of size-selected nonmetallic residue from a metal shredder recovery system and cementitious particles. The invention also provides processes that enhance the recovery of metal and, at the same time, produces a low metal content residue that can be used in the cover. All percentages herein are by weight. The features below can be variously combined.

In one aspect, the invention features a metal shredder residue-based landfill cover material formed of a mixture of moist substantially non-metallic shredder residue of a selected maximum size of about 2 inches or less and a predetermined amount of inorganic cementitious particle component.

In another aspect, the invention features a metal shredder residue-based landfill cover material formed of compactable, rebounding mixture of moist substantially non-metallic residue of a selected maximum size of about 1 to 2 inches, and kiln dust in small particulate size, such that particulates are attached to the surface of readily ignitable pieces of the residue. The kiln dust is about 3–12 percent of the material. The material further has about 15–22 percent moisture.

In particular embodiments, these aspects may include one or more of the following additional features. The residue has a maximum size of around 1.5 inch or less. The shredder residue has 1 percent or less metal. A distribution of particles of the cementitious component is attached over the exposed surface of readily ignitable pieces of the residue. The cementitious particle component is portland cement or kiln dust. The material is about 3–12 percent, preferably about 10 percent kiln dust. The material has about 15–22 percent, preferably about 18–20 percent moisture. The shredder residue is residue from shredding metal items that are predominantly automobiles. The material exhibits compactability of around 15–20 percent. The material exhibits rebound of around 5–10 percent. The material includes an agent that binds leachable metals. The material has kiln dust at around 3 to 4 percent and the cover material further includes an agent that binds leachable metals. The material has a density of around 50 lbs./cubic foot.

In another aspect, the invention features a method for processing scrap metal that includes providing a scrap feed composed predominantly of automobiles, shredding the scrap feed to form small shredded feed, and cleaning the shredded feed to remove substantially non-metallic residue and collecting clean metal suitable for recycling. The residue is screened to provide fine residue composed of a selected maximum size of about 2 inches or less. The fine residue is mixed with a predetermined amount of inorganic cementitious particulate component to form a material suitable for use as landfill cover.

In particular embodiments, the methods may also include one or more of the following features. The screening is with a rotating, dynamically flexing cable-type screen. The screening provides fine residue of a maximum size of about 1.5 inch or less. The method includes controlling the level of moisture in the residue prior to the mixing with the cementitious component to provide a cover material with a moisture content in the range of 18–20 percent. The cementitious material is kiln dust and mixing so that the kiln dust is about 10 percent of the cover material. The method includes collecting large pieces removed by the screening and treating the large pieces to recover metal. The method includes collecting the large pieces after the treating, shredding the large pieces to smaller size, and mixing the shredded pieces with the fine residue and cementitious material to form the material suitable for use as a landfill cover. The method includes adding an agent that binds leachable metals.

In another aspect, the invention features metal shredder residue-based landfill cover material formed according to the methods mentioned above.

In another aspect, the invention features a system for processing scrap metal including a metal shredding unit for shredding large scrap feed into small shredded feed and cleaning apparatus for cleaning the small shredded feed to produce a substantially metallic, recyclable product and a substantially non-metallic residue. A screen is provided for separating large pieces of the residue and collecting fine residue of a select maximum size of about 2 inches or less. Recovery apparatus recovers trace metal from the large pieces of residue and shredding apparatus shreds the large pieces of residue after recovering metal to produce fine residue having a select maximum size of about 2 inches or less. Cementitious particle component supply provides cementitious particle component. Meter apparatus delivers a controlled relative amount of the fine residue and cementitious component. Mixing apparatus receives the controlled relative amount of the fine residue and cementitious material and thoroughly mixing the fine residue and cementitious particle component to produce a material suitable for use as a landfill cover.

In another aspect, the invention features a system for processing scrap metal including a metal shredding unit for shredding large scrap feed into small shredded feed and cleaning apparatus for cleaning the small shredded feed to produce a substantially metallic, recyclable product and a substantially non-metallic residue. A screen is provided for separating large pieces of the residue and collecting fine residue substantially of a select maximum size of about 2 inches or less. Recovery apparatus recovers trace metal from the large pieces of residue. Shredding apparatus shreds the large pieces of residue after recovering metal to produce fine residue having a select maximum size of about 2 inches or less. The fine residue has a low metal content of about 1 percent or less.

Preferably, in these systems, the screen is a rotating, dynamically flexing cord-type screen and the recovery apparatus includes a destoner for separating heavy elements of the large pieces of the residue from smaller pieces of the residue.

In another aspect, the invention features a method for managing a landfill by providing a landfill cover material described above, receiving refuse and spreading the refuse as fill, stopping the receiving and spreading of the refuse after a determined period of time, spreading the landfill cover in a layer over the refuse, and repeating the above steps. Preferably, the method is repeated each day and the landfill cover material is spread to a depth of about 6 inches.

The advantages of the inventions are numerous. The cover material can improve landfill operations by significantly reducing costs, conserving landfill capacity, and increasing protection of public health and safety in the environment. Metal shredder residue itself does not become part of the landfill waste, but instead is processed to form the cover material that replaces higher cost cover materials such as soil. Moreover, the cover material of the invention can perform better than soil because it is more compactable and acts as a levelling agent, allowing a more uniform daily cover. The cover material can exhibit properties in compliance with environmental cover material requirements. These properties include erodability, ignitability, PCB and heavy metal content, corrosivity, leachability, toxicity, compactability, dust generation potential, odor control, litter control, vector control and ability to maintain a physical separation between solid waste and the surface environment.

Other features and advantages follow.

BRIEF DESCRIPTION OF THE DRAWINGS

We first briefly describe the drawings.

Drawings

FIG. 3 is an elevation view of equipment for carrying out part of the process of FIG. 2.

DESCRIPTION OF THE PREFERRED EMBODIMENT(S)

Figure 1:
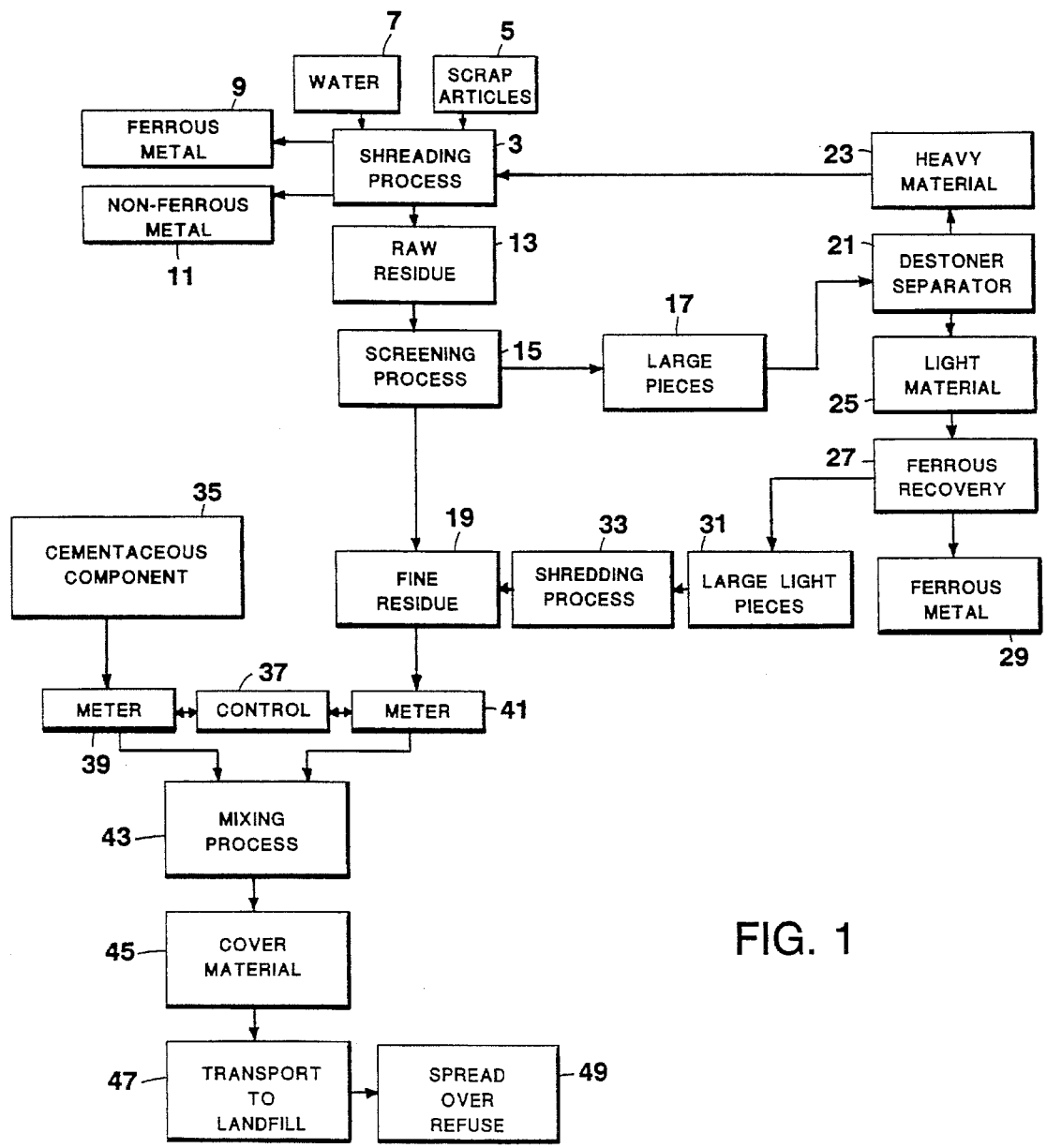
FIG. 1 is a block diagram of a process according to the invention.

Referring to FIG. 1, a process according to the invention is illustrated in which size-selected substantially non-metallic shredder residue is mixed with cementitious particles to produce a landfill cover material. The process includes a shredding process 3, for shredding waste scrap metal items 5, such as automobiles, home appliances (dishwashers, etc.), and miscellaneous light iron. The shredding process recovers ferrous metals 9 and nonferrous metals 11, both of which can be recycled, and produces as a by-product substantially non-metallic raw residue 13.

The raw residue 13 is a composite of variously sized pieces (usually 10 inches and less) of synthetic foam rubber, fabric, plastic, glass, stone, and soil and dirt that has collected, for example, on the underbodies of automobiles, appliances and the other items fed to the shredding process. Raw residue is a particularly fibrous, noncombusted material characteristic of the shredding process with many properties that do not vary greatly with the material being shredded. On the other hand, it is believed that certain properties (e.g., compaction, rebound, density) that make the residue particularly useful for producing cover material according to this invention can be optimized by using non-metallic residue from a shredding feed composed predominantly of automobiles, preferably 80 percent or more automobiles. Other items with relatively large amounts of rubber, plastic, glass, etc., might also be used to the same effect.

The raw residue 13 is passed to a screening process 15 to separate pieces that are larger than a selected maximum size. As discussed in the Example below, because of the unusual fibrous nature of raw residue, the screening process preferably involves a cylindrical rotating screen formed of dynamically flexing cables, that makes the screen self-cleaning and avoids clogging. The screening process separates large pieces 17 of the raw residue from smaller pieces that pass through a screen with openings of about 2 inches or less, preferably 1 to 2 inches, more preferably about 1.5 inch. These smaller pieces are collected as fine non-metallic residue 19. (It will be appreciated that, while the screening substantially enhances the uniformity of the maximum size of the fine residue, occasional larger size pieces will pass through the screen because of their irregular shape or because of their compressability, which allows such pieces to squeeze through the screen openings.)

The large pieces 17, those rejected in the screening process, are passed to a destoner separator 21 which separates heavy material 23, from light material 25. Both are further processed to enhance metal recovery. The heavy material 23, usually a mixture of glass and heavy rubber with trapped metals, is cycled back to the shredder process 3 to recover the metals. (This material may be reintroduced to the process downstream of a shredding unit.) The light material is exposed to a metal recovery process 27, e.g., magnetic separation, to remove ferrous metal 29, which is collected and reused. The material 31 from metal recovery process 27, which is a light non-metallic material including relatively large components, is sent to a shredder 33, which shreds the residue to smaller size, generally less than about 2 inches, which is collected as fine residue 19.

The fine residue 19 has a moisture content in the range of about 15–22 percent, preferably 18–20 percent. The moisture content can be controlled directly by adding water to the raw residue, or, more preferably, by adding water from a source 7 associated with the shredding process, where it also serves as a coolant during shredding. The addition of water is dependent on weather conditions.

To produce the cover material, the moist fine residue 19 is mixed with an inorganic cementitious particle component 35, which may be, for example, lime, cement, or cement kiln dust. A control 37 adjusts meters 39, 41 which provide a desired amount of the cementitious component and fine non-metallic residue to a mixing process 43. The cementitious component is preferably about 3–12 percent, more preferably around 10 percent of the mixture. Smaller amounts may be used if the cementitious component is pure cement. The mixing process 43 uniformly mixes the fine residue 19 and cementitious component 35 to produce the landfill cover material 45. The cover material can be transported to a landfill 47 and spread over the refuse 49 at a depth of about 6 inches.

The process, including screening raw residue to separate large components, followed by metal recovery from the large pieces, provides a fine residue that has substantially reduced metal content, making it particularly suitable for use as a component of the cover material because the level of metals is less. Preferably, the fine residue has a metal content of about 1 percent or less. Moreover, the metal recovered from the large pieces can be recycled. About 80–90 percent of the metal in the raw residue (typically containing around 3–4 percent metal) can be recovered. Preferably, the shredding process that produces the raw residue also maximizes the metal recovery and minimizes the metal content in the residue. The shredding process may include a series of steps e.g., shakers, vacuum systems, air blowing, aqueous washing systems, etc. in which light material is separated from heavy material. The light material, with relatively low metal content is deposited as the raw non-metallic residue. The heavy material, containing greater metal content is further processed to remove and recover the metal before depositing as raw residue. The low metal content fine residue is, of course, also suitable for direct disposal in a landfill.

The cover material is a moist mixture of fine non-metallic residue, having substantially the maximum piece size set forth above, and a coating of cementitious particles. The maximum size of fine residue is an important feature. If the size of the pieces is too large, they can be picked up by the wind or, if flammable, such as foam rubber, they are more likely to ignite. If smaller flammable pieces do ignite, they are more likely to burn out before engaging neighboring pieces. The distribution of fine residue pieces within the material, both with respect to size and flammability, creates a composite that also inhibits substantial spread of fire if a flammable piece begins to burn. Moreover, a smaller maximum size provides a greater surface area, which is more uniformly coated with cementitious component. On the other hand, shredding and screening the material to form fine residue pieces with a very small maximum size requires higher power consumption. Non-metallic residue pieces in the ranges above, particularly around 1.5 inch maximum size, provide a cover material with high performance, that can be economically produced.

The cementitious component is preferably provided in dust-size particles. The particles, which become attached to larger non-metallic residue pieces during the mixing step, are believed to reduce the flammability of pieces composed of readily ignitable material, e.g., foam rubber. The cementitious material is also believed to agglomerate smaller residue components. This latter feature, along with the increase in density the cementitious component provides, enhances the stability of the cover material so it is not picked up by wind or washed away by rain. The cementitious component also chemically binds metals, which reduces the leaching of metal remaining in the fine residue after the recovery processes.

The moisture level in the fine residue is also an important feature. It is believed that the moisture absorbed in the fine residue is taken up by the cementitious component during mixing, which helps provide an even coating.

The cover material has many additional beneficial properties. The cover exhibits a compaction, typically around 15–20 percent, and has an ability to rebound, typically around 5–10 percent, after removing a load, such as during placement with a dozer. Therefore, a typical six-inch coating can be achieved with a small amount of uncompacted material. Yet, under the pressure of subsequent layers of waste, the material will compact, resulting in a higher waste-to-cover ratio and a more efficient use of landfill volume. The compaction and expansion properties also help to level the landfill because the material conforms to and fills in the irregular surface of a layer of waste.

In addition, the cover material has been found particularly useful in colder climates since it does not freeze into solid blocks, like sand and gravel, so it is easier to spread during the winter. This property is believed to be due to the fibrous nature of the material. In warm, dry weather conditions, the material may create some dust, which can be reduced by adding moisture.

Moreover, the material does not substantially erode in rainfall. This property, it is believed, is due in part to its absorbent characteristics. The material is also effectively odor free. There is no food component which could attract vectors.

It will be appreciated that the cover material might also include agents, where desirable, to bind leachable metals like lead. Examples of these agents include trisodium phosphate (TSP), and polysilicate agents, such as Industrial Control System K-20/LSC, available from Lopat Enterprises, Inc., Wanamass, N.J. (see also "Application of the Polysilicate Technology to Heavy Metal Waste Streams", by G. J. Trezek, submitted to State of California Dept. of Health Services Toxic Substrates Control Division Alternative Technology Section, August 1987, Grant number 85-00180). The amount of cementitious component in the cover material may be reduced when those agents are used. When kiln dust is used, at least about 3–4 percent is generally required to provide the fire barrier and other properties for cover material performance, while the addition of an additive helps reduce leaching. When kiln dust is used at a level of preferably around 10–12 percent, no other additive is typically needed to bind lead. The cover material can also be mixed with other materials such as sand and gravel.

The inventions will be further described by way of the following Example.

EXAMPLE

Process

Figure 2:
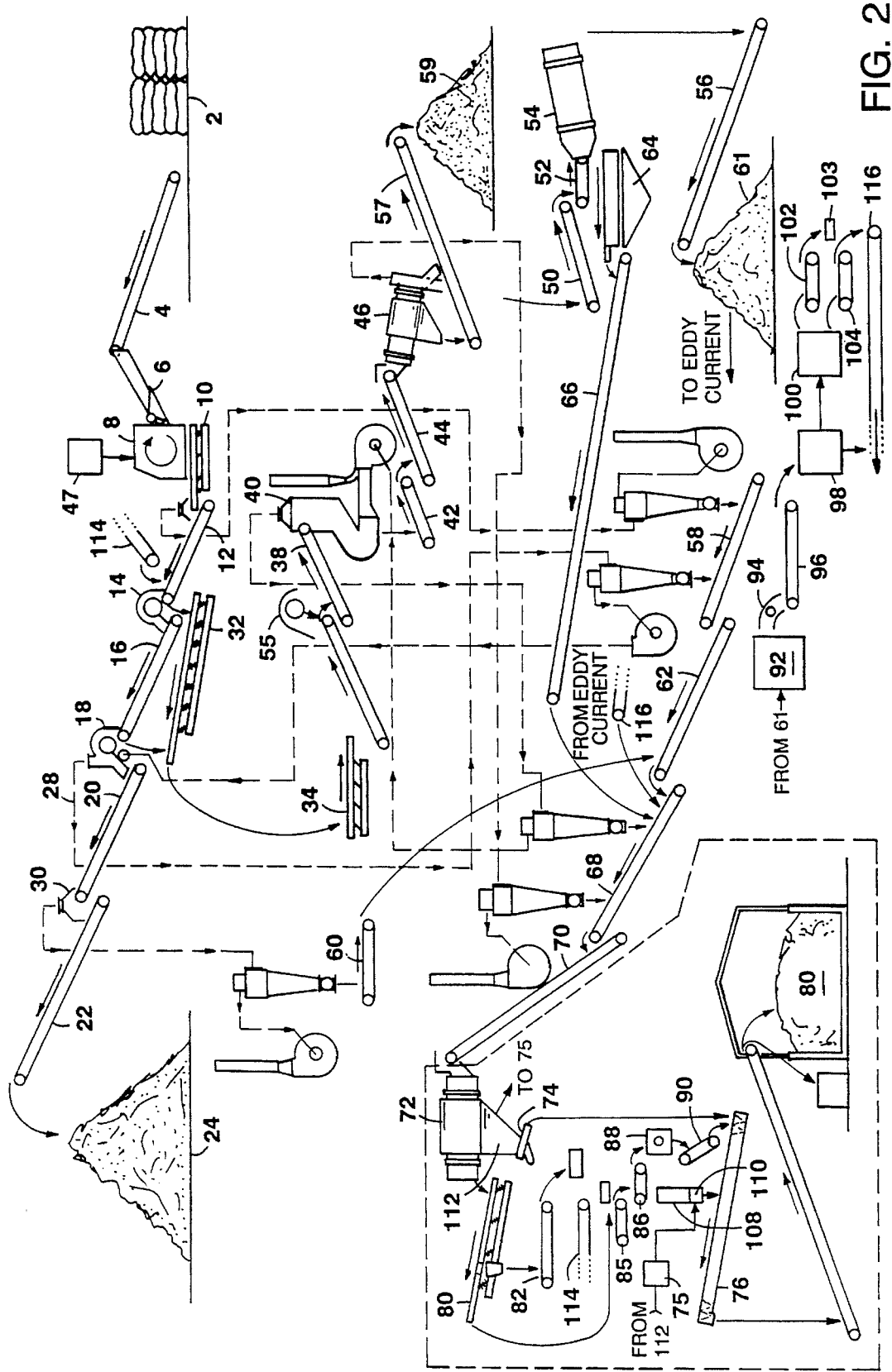
FIG. 2 is a flow schematic of a preferred process according to the invention.

Referring now to FIGS. 2 and 3, a preferred process is illustrated. Metal waste material made up of 80 percent or more automobiles 2 is positioned on a conveyor 4 that brings it to a feed chute 6 for delivery into a shredder unit 8. The gas tanks are removed from the automobiles prior to shredding to avoid explosion hazard. The batteries and tires are also removed to avoid introducing large amounts of lead to the cover material. Otherwise the automobiles are whole, in either compressed or uncompressed state.

The shredder unit 8 is a 6,000 horsepower hammermill-type shredder with a 35-ton flywheel, electromagnetic clutch and 24 hammers, each of which weighs 420 lbs. The unit 8 includes a grate with 6 inch by 9 inch openings that generally pass shredded pieces of that size or smaller. The shredder unit 8 also has a water supply 47 to provide cooling water and to produce non-metallic residue with the moisture content needed to produce landfill cover. In winter in the northeast United States, or during rainy weather, and with a waste material that is about 80 percent or more automotive salvage, additional water is usually not needed. The water supply may be a solution of a metal-binding agent such as a two percent solution of TSP.

The shredded pieces from the shredder unit 8 fall through the grate onto a shaker conveyor 10 (General Kinematics, Model SCAL 72/84X20, Barrington, Ill.) that spreads the material across the conveyor and jars the material to loosen dirt, etc. The pieces are delivered to a conveyor 12, which passes the pieces to a magnet 14 (Stearns Magnetic, Model 42X96, Cudahy, Wis.). Ferrous material is conveyed by the magnet to a second conveyor 16, which in turn transfers ferrous material to a third conveyor 20, using magnet 18 (Stearns Magnetic, Model 42X96). The conveyor 20 delivers the material to a transfer conveyor 22 that takes the substantially ferrous pieces to a storage pile 24. The material in the storage pile 24 is typically 99 percent ferrous metal (ISRI, specifications 210–211).

In the course of separating the heavy ferrous metals, heavy substantially non-ferrous containing shredded pieces and light substantially non-metallic pieces are separated. The light material, collected with vacuum systems 26, 28 and 30, makes up part of the raw non-metallic residue and will be further discussed below. The heavy material falls from the conveyors 12, 16 onto a shaker conveyor 32 (General Kinematics, Model SCAL 72/84X16). This material is primarily mixed non-ferrous metals (e.g., Al, Zn, Cu), rubber, rock, glass, etc. and is fed to a shaker conveyor 34 (General Kinematics, Model SC 30X16X12', 5") and onto a conveyor 36 that includes a magnet 55 (Stearns Magnetic, permanent head pulley 24X36) to, again, separate ferrous metals. After this recovery step, the heavy material passes to a conveyor 38 which delivers it to a z-box separator 40 (Texas Shredder parts, Model 48, Houston, Tex.). The separator is a z-shaped tunnel in which an airstream is introduced from the bottom and the material delivered from the top. The material impacts the walls of the separator, jarring loose light components that are picked up by the airstream and become part of the raw residue as will be further discussed below. The heavier non-ferrous material falls out of the z-box separator 40 and is transported by conveyors 42, 44 to a trommel screen 46.

The trommel screen is 48 inches in diameter, 20 feet long, and includes 1 inch openings in a rotating, ⅜ inch thick metal sheet. Material that passes through the trommel screen, non-ferrous containing material about one inch in size, is transferred by conveyor 57 and stored in a stockpile 59 for storage before it is sent to a smelter operation to recover usable nonferrous metal. The larger non-ferrous material, over one inch, that does not pass through the trommel screen is transferred by conveyors 50, 52 to a washer 54.

The washer 54 is a countercurrent arrangement including a rotating drum with transport screw. The screw lifts material upward while water flows downward at about 300 gal/min to wash away loose particulate. The wash solution carrying the particulate matter passes to a dewatering screen 64 (Hewlett-Robins, 4 foot by 12 foot, 3 mm openings, Model U1-9, Columbia, S.C.) that separates the particulate which becomes part of the raw residue as will be further discussed below. Heavy material exiting the washer 54 is transferred by a conveyor 56 to a stockpile 61, where it awaits further recovery by eddy current separation.

The eddy current separation process includes a feeder 92, including a magnetic separator 94 (Stearns Magnetic, Model 24X36) that further removes any ferrous metals, and passes the remaining material to conveyor 96 which delivers it to a finger screen 98 (General Kinematics, Model SC 36X21). Material passed through the screen 98 goes into an eddy current magnet 100 (Steinert, 30' magnet, Germany), that separates non-ferrous metals, which are conveyed to a storage bin 103 on a metallic conveyor 102, from non-metallic materials such as rubber and stone, which are conveyed on a conveyor 104. The non-metallic materials, along with the material that did not pass the finger screen 98, are dropped onto conveyor 116, and become part of the raw non-metallic residue as discussed below.

Light, substantially non-metallic material is removed in the processes described above and collected as raw residue. Vacuum systems 26, 28 and 30 (Chicago Blowpipe, 125 horsepower units, Chicago, Ill.) draw light materials during the initial ferrous metal separation. The vacuums can remove fine, dust-size particles, as well as large pieces, much greater than 2 inches in size, (e.g., 10 inch pieces) that become loosened on the conveyors. The light materials from vacuum systems 26, 28 are exhausted onto a conveyor 58. Light material from vacuum 30 is exhausted onto a conveyor 60. The material from conveyors 60 and 58 are combined on a conveyor 62, which directs the material to a conveyor 68.

Material in the airstreams from the z-box 40 and trommel screen 46 are also exhausted to conveyor 68. Waste material from the washing stage 54 passes through dewatering screen 64 and onto a conveyor 66 which deposits it again, on conveyor 68. Finally, the light material from the eddy current separation is also deposited, via conveyor 116, onto conveyor 68. These materials, the raw non-metallic residue, are then carried from conveyor 68 to conveyor 70 from which they will be further processed to produce landfill cover material.

The raw residue collected on conveyor 70 is delivered to a screen (such as REMU, Model MSU2-300, American Recycling Equipment Corp., Perlin, N.J.). The screen is a rotating drum screen that includes dynamically flexing cables that help prevent clogging. In the preferred unit, the commercially-available screen is modified to double the drum length to six meters, which increases the residence time of the material in the drum. The system also includes cleaning brushes which project from the outside of the cylinder into the screen openings to back flush material and prevent clogging. In the preferred unit, two brushes running the full length of the screening area are arranged in adjacent corners of the support frame that contains the drum. The unit includes four oversized hydraulic motors (SAI MI 300) with six rollers under the drum. The drum rotates at 18–19 rpm at typical loads of 20 tons/hr. At lower loads, rotation speed is reduce by about 80%. Under typical conditions, about 50% of the residue fed to the screen is passed through the openings.

The screen size-selects the fine residue from raw non-metallic residue. Pieces smaller than the rectangular screen openings, which are about 1.5 by 0.5 inch in the preferred unit, fall through the screen onto a vibrating feeder 74. The feeder 74 has an ultrasonic sensor 112 which monitors the depth of fine residue on the screen. The output of the sensor 112 is received by a control 75 that controls a meter 110 on a silo 108 to release a desired amount of kiln dust (about 89 percent cement particles, Material Resources, Clifton Park, N.Y.). The fine residue and kiln dust are mixed in a pugmill 76. The pugmill is 36 inches in diameter, 30 feet long with over 30 screw flights, which rotate at about 20 rpm. The kiln dust preferably is around 10 percent of the mixture or 4 percent of the mixture if lead binding agent has been added to the process. The material exits the pugmill onto a conveyor 78, which may also include a ferrous magnetic separator (Stearns Magnetic, Model 24X36), that delivers the cover material 80 to storage.

Large, oversized pieces of the raw residue that do not pass through the screen 72 are delivered to a vibrating destoner 80 (General Kinematics, 48 inch wide destoner) that separates heavy pieces from light pieces. The heavy pieces are passed to magnetic separator 82 (Stearns Magnetics, Model 24X36) to remove ferrous metal that might still be present. The large heavy pieces then pass back to the shredding process, via conveyor 114, for further separation and recovery. Large lighter pieces move by conveyor 85, which includes a magnetic separator for ferrous recovery, to conveyor 86, which delivers to a shredder 88 (American Pulverizer, Model WXR60, St. Louis, Mo.), where the large light pieces are reduced in size to about 1.5 inch or less and then delivered by conveyor 90 to the pugmill as fine residue. (Alternatively, the material from the shredder 88 is delivered again to the screen 72 to assure proper sizing and metering.) The process of separating and treating the large pieces recovers additional metal, about 3 to 4 percent of the weight of the large raw residue components. The additional metal recovered is typically about 2 percent ferrous and 1 percent nonferrous. The fine residue typically has a metal content of around 0.8 percent or less.

The residence time of material in the pugmill is about 5 seconds. The time from entry of metal item to the shredder 8 to deposit of cover material is about 15 seconds.

Referring to FIG. 3 an arrangement of components for producing the landfill cover from raw non-metallic residue is illustrated in a side elevation. The screen 72, shredder 88 and silo 108 (120 ton capacity) are positioned linearly along the pugmill 76.

Cover Material

A preferred cover material formed according to the process above has a maximum size of fine non-metallic residue of around 1.5 inch, moisture content of 18–20 percent, kiln dust content of around 10 percent and a density of approximately 50 lbs./cubic foot, which is less than typical fine soils. The material has a leachable lead level of less than 5 ppm and a leachable cadmium level of less than 1 ppm. The material is compactable and rebounds. Compaction can be measured by placing a sample into a cylinder and compressing at 500 psi (ASTM D-698). A sample with 20 percent moisture is compressed about 20 percent. If the load is applied for five minutes, then released, the sample rebounds about 8 percent after the load is removed. Higher moisture content may produce lower compression and rebound.

Fire Control

To simulate a scenario where landfill material is subject to an intense, prolonged heat source, the cover material described above was exposed to an ignition source consisting of burning tire material. The purpose of the test was to address not only the material's resistance to combustion but also its ability to smother material undergoing combustion. The weather conditions on the date of the test were overcast, with temperatures of approximately 40° F. and light and variable winds.

Shredded automotive tire pieces were placed in a layer approximately 4 inches in depth on a loosely compacted gravel surface and ignited using charcoal lighter fluid. While waiting for the tire material to become fully involved, a support apparatus was prepared. The support apparatus was a wooden frame, measuring two feet by four feet, constructed of two by four studs and two inch by four inch mesh field fence, with one quarter inch mesh hardware cloth. Five gallon plastic pails of the cover material remained sealed until immediately prior to placement on the support frame. Approximately three and a half inches of the material was applied to the support frame and evenly distributed by hand. Consolidation of the material was affected by hand distribution, with no compactive effort being applied. Approximately four inches of one end of the frame was left uncovered, and an opening was prepared beneath the frame on the opposite end to allow sufficient air to support combustion of the tire material. The frame was placed over the burning tire material.

Over approximately 80 minutes, the test was closely monitored, with no combustion or flame emergence through the material being observed. About one hour into the test, a piece of rubber, which appeared to be similar to door gasket material, adjacent to the open end of the flame and subject to direct, visible flame contact, did ignite. The isolated material in question burned itself out, and similar material throughout the mass of the cover material showed no indication of ignition throughout the demonstration. About 80 minutes into the test, the support frame was removed from the ignition source and set aside. Inspection of the cover material surface in immediate contact with ignition source showed no indication of combustion.

Additional tire matter was added to that already burning and allowed to become fully involved. The cover material support frame was then inverted over the ignition source, placing the cover material in direct contact with the burning tires. At this time, the material was again observed with the surface previously in contact with the ignition source showing no sign of combustion. Small foam particles appeared to have become molten, fusing with adjacent materials. During the period where the cover material was in direct contact with the ignition source, no flames were observed emerging from the material. After about 45 minutes, the cover material was removed from the ignition source. The material completely extinguished the burning tire material when in direct contact with it, with no indication of ignition being observed in the cover material. At no time during the demonstration did the components of the cover material located in the mass of the cover material exhibit any tendency toward ignition, with only one isolated rubber item actually igniting during the demonstration.

Chemical and Leaching Characteristics

Aliquots of the cover material were subject to a series of chemical and leaching tests.

A sample was analyzed for constituent TCLP/EP toxicity heavy metal concentrations as well as ignitability, corrosivity, acidity and alkalinity. Total PCB concentration, as dry weight, was also determined. The analyses were performed following Environmental Protection Agency document SW846 (edition as of May, 1991). The results are reported in Table 1:

TABLE 1

| Parameter | Concentration (ppm) |
| --- | --- |
| Arsenic | 13.9 |
| Barium | 955 |
| Cadmium | 40.6 |
| Chromium, Total | 1118 |
| Lead | 891 |
| Mercury | 0.71 |
| Selenium | 1.58 |
| Silver | <1.0 |
| Copper | 23,465 |
| Nickel | 104 |
| Zinc | 3740 |
| Nitrogen (Total) | 69 |
| Ignitability | Sample Heated to 160° F. w/o Flash |
| Corrosivity | Not Corrosive |

TABLE 1-continued

| Parameter | Concentration (ppm) |
|---|---|
| Alkalinity | 1193 |
| Acidity | <10 |
| PCB[1] | 5.6 |

The sample was also subjected to a full scan Toxic Characteristic Leaching Procedure (TCLP), SW846 method 1311. The results are reported in Table 2.

TABLE 2

| Parameter | Concentration (mg/l) |
|---|---|
| TCLP Metals (mg/l) | |
| Arsenic | <0.10 |
| Barium | <1.0 |
| Cadmium | 0.16 |
| Chromium, Total | <0.50 |
| Lead | <0.50 |
| Mercury | <0.010 |
| Selenium | <0.10 |
| Silver | <0.10 |
| Volatile Organics (ppm)[2] | |
| Benzene | ND |
| Carbon Tetrachloride | ND |
| Chlorobenzene | ND |
| Chloroform | ND |
| 1,2-Dichloroethane | ND |
| 1,1-Dichloroethylene | ND |
| 2-Butanone (MEK) | <1.0 |
| Tetrachloroethylene | ND |
| Trichloroethylene | ND |
| Vinyl Chloride | ND |
| Semi-Volatile Organics (ppm)[3] | |
| Pyridine | ND |
| O-Cresol | ND |
| M-Cresol | 0.12 |
| P-Cresol | 0.12 |
| 1,4-Dichlorobenzene | ND |
| 2,4-Dinitrotoluene | ND |
| Hexachlorobutadiene | ND |
| Hexachloroethane | ND |
| Nitrobenzene | ND |
| Pentachlorophenol | ND |
| 2,4,5-Trichlorophenol | ND |
| 2,4,6-Trichlorophenol | ND |
| Hexachlorobenzene | ND |

[1]Reported as "Dry Weight"
[2]Method 8240, Quantitation Limit = 0.10 ppm
[3]Method 8270, Quantitation Limit = 0.10 ppm Based on these analyses, the sample does not meet the definition of TC toxic hazardous waste.

The material was also subject to a rainfall/runoff simulation. The simulated rainfall was applied to a portion of the cover material and the runoff collected for analysis was identified as "first flush". Multiple amounts of simulated rainfall were then applied and the runoff from the fourth flush was collected for analysis. As can be seen in Table 3 below, some parameters are indicated in the first flush possibly as a result of the physical migration of solid particles. The concentrations of all parameters were significantly reduced by the fourth application.

TABLE 3

| Parameter | 1st Flush (mg/l) | 4th Flush (mg/l) |
|---|---|---|
| Arsenic | 0.10 | <0.005 |

TABLE 3-continued

| Parameter | 1st Flush (mg/l) | 4th Flush (mg/l) |
|---|---|---|
| Barium | 0.42 | 0.16 |
| Cadmium | <0.050 | 0.001 |
| Chromium, Total | 2.51 | 0.065 |
| Lead | 2.66 | 0.32 |
| Mercury | <0.011 | <0.001 |
| Selenium | <0.010 | <0.005 |
| Silver | 0.11 | <0.005 |
| Copper | 9.46 | 0.29 |
| Zinc | 5.36 | 0.80 |
| Oil & Grease | 30 | 6 |
| Suspended Solids | 300 | 22 |
| PCB | <10 | — |

Field Testing

A test of the cover material was conducted at a landfill facility. The investigation included observing the receipt and application of domestic waste and the subsequent covering of the waste with the cover material and other materials. At the facility, at approximately 3 p.m. the receipt of waste was ceased and application of the cover was initiated. Using dozers, workers spread the materials from stockpiles. The material appeared to be easily worked and rapidly covered the waste. The material was readily moved and spread using the heavy equipment and the application of the desired approximate 6 inch depth was achieved. As a load of the cover material was dropped upon the fill, a slight release of dust occurred. This release, however, was not significantly different when compared to other stockpiled materials that were applied during this investigation. The cover material performed similar to natural soils and ease of application and covering capabilities. In the generally dry, spring weather conditions of the test, the cover material of the invention appeared to release slightly more dust than natural soil. The dust release was reduced when the cover material was damp from rainy conditions.

There was considerable seagull activity in the open portions of the waste material. There were some resting seagulls on the covered portion of the fill. The majority of the bird population, however, was airborne or actively working the uncovered waste. As the cover material of the invention was applied, the seagulls lost interest in that portion of the fill and transferred to the still uncovered portion.

The stockpile of the cover material was observed at close hand and no odor other than a slight soil-like odor was in evidence. Application of the cover material appeared to eliminate the normal waste odor, common in a landfill. The cover material appears to provide equivalent odor control as natural soil.

Over an approximately four month period, 7,920 cubic yards (cy) of uncompacted cover material were used. Based on a 15 percent compaction rate, the estimated decrease in soil use is 6,732 cy. The calculated amount of landfill space conserved by using the cover material rather than disposing of it as solid waste is approximately 13,464 cy, assuming that the cover material is compacted at the same compaction rate (15%) if placed with other waste in the landfill.

Other embodiments are in the following claims.
What is claimed is:
1. A daily landfill cover material comprised of a compactable, rebounding mixture including, predominantly, water-containing metal shredder residue with waste pieces having a maximum size of about 1 to 2 inches, and said mixture further including inorganic cementitious particle component attached to said residue waste pieces, said cementitious particle component being present in sufficient amount to increase the density of said mixture for enhancing the stability of said cover upon exposure to wind and rain and to reduce the ignitability of flammable residue-waste pieces.

2. The material of claim 1 wherein said waste pieces have a maximum size of around 1.5 inch.

3. The material of claim 1 wherein said shredder residue comprises 1 percent or less metal.

4. The material of claim 1 wherein said cementitious particle component is portland cement or kiln dust.

5. The material of claim 4 comprising about 3–12 percent kiln dust.

6. The material of claim 5 comprising about 10 percent kiln dust.

7. The material of claim 1 comprising about 15–22 percent water.

8. The material of claim 7 comprising about 18–20 percent water.

9. The material of claim 1 wherein said shredder residue waste pieces are from shredding metal items that are comprised predominantly of automobiles.

10. The material of claim 1 having a compactability of around 15–20 percent.

11. The material of claim 1 having a rebound of around 5–10 percent.

12. The material of claim 1 or 5 including an agent that binds leachable metals selected from the group consisting of trisodium phosphates and polysilicates.

13. A daily landfill cover material comprised of a compactable, rebounding mixture of metal shredder residue with waste pieces having a maximum size of about 1 to 2 inches, and said mixture further including kiln dust attached to the residue waste pieces, said kiln dust comprising about 3–12 percent of said material to increase the density of said mixture for enhancing the stability of said cover upon exposure to wind and rain and to reduce the ignitability of flammable residue waste pieces, and said material further comprising about 15–22 percent water.

14. The material of claim 13 wherein said waste pieces have a maximum size of around 1.5 inch.

15. The material of claim 14 comprising about 10 percent kiln dust.

16. The material of claim 5 comprising about 18–20 percent water.

17. The material of claim 16 having a compactability of around 15–20 percent.

18. The material of claim 17 having a rebound of around 5–10 percent.

19. The material of claim 16 or 18 wherein said shredder residue comprises 1 percent or less metal.

20. The material of claim 16 or 18 having a density of around 50 lbs./cubic foot.

21. The material of claim 18 wherein said kiln dust comprises around 3 to 4 percent of said material and said cover material further includes an agent the binds leachable metals, said agent selected from the group consisting of trisodium phosphates and polysilicates.

22. A daily landfill cover material formed according to the method of:

providing a scrap feed composed predominantly of automobiles, shredding said scrap feed to form shredded feed;

cleaning said shredded feed to provide substantially non-metallic water-containing residue waste pieces;

screening to provide residue with waste pieces having a maximum size of about 1 to 2 inches; and mixing said residue with a minor amount of inorganic cementitious particle component to attach said cementitious component to said waste pieces, said cementitious particle component being added in sufficient amount to increase the density of said mixture for enhancing the stability of said cover material upon exposure to wind and rain and to reduce ignitability of flammable residue waste pieces.

23. The daily landfill cover material of claim 22 formed according to the method further comprising collecting large pieces removed by said screening and recovering metal from said large pieces, collecting the large pieces after said recovering, shredding said large pieces to smaller size, and mixing said shredded pieces with said fine residue and cementitious material to form said material suitable for use as a landfill cover.

24. The daily landfill cover material formed according to the method of claim 22 further comprising adding an agent that binds leachable metals selected from the group consisting of trisodium phosphates and silicates.

25. The daily landfill cover material of claim 22 formed by the process further comprising screening said residue with a rotating, dynamically flexing cable-type screen.

26. The daily landfill cover material of claim 25 formed by the process further comprising screening to provide residue waste pieces with a maximum size of about 1.5 inch.

27. The daily landfill cover material of claim 26 formed by the process further comprising controlling the level of moisture in said residue prior to said mixing with said cementitious component to provide a cover material with a water content in the range of 18–20 percent.

28. The daily landfill cover material of claim 27 formed by the process wherein said cementitious material is kiln dust and mixing so that said kiln dust is about 10 percent of said cover material.

29. The material of any one of claims 1, 13, or 22 wherein said material is compressed about 20% at 500 psi (ASTM D-698).

30. The material of any one of claims 1, 13, or 22 wherein said material rebounds about 8 percent.

31. The material of any one of claims 1, 13, or 22 wherein said material has a density of about 50 lbs./cubic foot.

32. The material of any one of claims 1, 13, or 22 wherein said daily landfill cover material has a leachable lead level of less than 5 ppm and a leachable cadmium level of less than 1 ppm.

\* \* \* \* \*